US012023951B2

(12) United States Patent
Sugdon et al.

(10) Patent No.: US 12,023,951 B2
(45) Date of Patent: Jul. 2, 2024

(54) SECURITY SHEET

(71) Applicant: De La Rue International Limited, Basingstoke (GB)

(72) Inventors: Matthew Sugdon, Basingstoke (GB); Baljeet Dhillon, Basingstoke (GB); Simon Quainton, Basingstoke (GB); Shireen Bobat, Basingstoke (GB)

(73) Assignee: DE LA RUE INTERNATIONAL LIMITED, Hampshire (GB)

( * ) Notice: Subject to any disclaimer, the term of this patent is extended or adjusted under 35 U.S.C. 154(b) by 0 days.

(21) Appl. No.: 17/904,198

(22) PCT Filed: Feb. 4, 2021

(86) PCT No.: PCT/GB2021/050241
§ 371 (c)(1),
(2) Date: Aug. 12, 2022

(87) PCT Pub. No.: WO2021/165640
PCT Pub. Date: Aug. 26, 2021

(65) Prior Publication Data

US 2023/0074837 A1 Mar. 9, 2023

(30) Foreign Application Priority Data

Feb. 20, 2020 (GB) ..................................... 2002395

(51) Int. Cl.
*B42D 25/351* (2014.01)
*B42D 25/45* (2014.01)
(Continued)

(52) U.S. Cl.
CPC ........... *B42D 25/351* (2014.10); *B42D 25/45* (2014.10); *B42D 25/328* (2014.10); *B42D 25/342* (2014.10); *B42D 25/378* (2014.10)

(58) Field of Classification Search
CPC .................................................... B42D 25/351
See application file for complete search history.

(56) References Cited

U.S. PATENT DOCUMENTS 11,066,786 B1 * 7/2021 Jones .................. B42D 25/378
2006/0249951 A1 11/2006 Cruikshank et al.
(Continued)

FOREIGN PATENT DOCUMENTS

DE 10 2015 212492 A1 1/2017
EP 3228471 A1 * 10/2017 ........... B42D 25/351
(Continued)

OTHER PUBLICATIONS

International Search Report and Written Opinion for International Application No. PCT/GB2021/050241 dated Apr. 9, 2021, 9 pages.
Combined Search and Examination Report for GB2002395.8 dated Aug. 24, 2020, 7 pages.

*Primary Examiner* — Kyle R Grabowski
(74) *Attorney, Agent, or Firm* — Morgan, Lewis & Bockius LLP

(57) ABSTRACT

The present disclosure is directed towards a security sheet (10) for displaying personal data (11) comprising a plastic substrate (12) comprising first and second outer surfaces (13, 14). A first opaque region (21) extends partially across the plastic substrate (12) between the first and second outer surfaces (13, 14). A first window (50) is at least partially surrounded by the first opaque region (21). A security device (51) comprises a transparent first device region (52) and a second device region (53) formed from a second device insert (55). The first and second device regions (52, 53) have different optical detection characteristics. The security device (51) is arranged in the plastic substrate (12) such that, when viewed in reflected light incident upon the first outer
(Continued)

surface (13), at least part of the first device region (52) is visible at least partially around the second device region (53) in the first window (50).

20 Claims, 6 Drawing Sheets

(51) Int. Cl.

| | |
|---|---|
| *B42D 25/328* | (2014.01) |
| *B42D 25/342* | (2014.01) |
| *B42D 25/378* | (2014.01) |

(56) References Cited

U.S. PATENT DOCUMENTS

| | | | | |
|---|---|---|---|---|
| 2015/0210107 | A1* | 7/2015 | Nugent | B42D 25/23 283/77 |
| 2018/0065397 | A1* | 3/2018 | Noizet | B42D 25/328 |
| 2018/0326777 | A1* | 11/2018 | Reddy | B42D 25/387 |
| 2019/0126661 | A1* | 5/2019 | Erickson | B42D 25/346 |
| 2019/0283482 | A1 | 9/2019 | Zernicek et al. | |
| 2020/0171875 | A1* | 6/2020 | Jolic | B42D 25/378 |

FOREIGN PATENT DOCUMENTS

| | | | | |
|---|---|---|---|---|
| EP | 3838611 | A1 * | 6/2021 | B42D 25/20 |
| EP | 3342602 | B1 * | 4/2022 | B42D 25/23 |
| GB | 2543054 | A | 4/2017 | |
| GB | 2567165 | A | 4/2019 | |

* cited by examiner

SECURITY SHEET

CROSS REFERENCE TO RELATED APPLICATIONS

This application is a U.S. National Phase Application of International Application No. PCT/GB2021/050241 filed on Feb. 4, 2021, which claims the benefit of GB Patent Application No. 2002395.8 filed Feb. 20, 2020, each of which is incorporated by reference herein in its entirety.

TECHNICAL FIELD

The present disclosure is directed towards a security sheet and a method of manufacturing such a security sheet.

BACKGROUND

Security documents and booklets, such as passports, passbooks, identification documents, certificates, licenses, cheque books and the like, commonly include a security sheet comprising a data sheet. A passport booklet typically comprises a cover, a plurality of internal visa pages and at least one security sheet displaying the personal data of the passport holder. Typically the visa pages are made from paper and are sewn together along a stitch line coincident with the fold of the document. The security sheet may be formed from a plastic, typically polycarbonate, and during its manufacture a number of thin plastic layers are laid over one another and laminated together, thereby forming a thicker plastic body.

The security sheet may comprise various security features, such as UV responsive arrangements, optically variable features, windowed or transparent features, laser-perforations, laser markings and tactile features. WO-A-2015/104011 discloses a method of forming a window in a plastic security sheet by punching a transparent filler material from a strip and inserting the filler material into an aperture punched through several thin plastic layers. During lamination the filler material and thin plastic layers fuse together to form the plastic sheet with a transparent window formed by the transparent filler material. WO-A-2017/060688 discloses a security sheet in which a window is formed from a second device insert and at least one security element is located within and/or on the insert. US-A-2018/0370062 discloses a method for making a window in a thin plastic layer by, in a single movement, punching an opening in an accommodating layer and inserting a second device insert into the opening.

SUMMARY

An object of the present invention is to provide a security sheet having improved security features and a method of manufacturing such a security sheet. A further object of the present disclosure includes improving the identification by inspection officers of any attempted fraudulent alteration of a security document.

The present disclosure therefore provides a security sheet and a method in accordance with the claims.

The security device can be verified visually by checking the relative location and optical detection characteristics of the first and second device regions in the first window. Such a security sheet is harder to counterfeit due to the increased complexity of manufacture of the security device including the second device insert forming the inner second device region and the surrounding transparent first device region visible in the first window. Furthermore, the opportunity to counterfeit such a security sheet is reduced due to the difficulties involved in obtaining the necessary materials for the different optical detection characteristics. Any attempted fraudulent adaptation of the security device may also be easily detectable by virtue of the residual marks from such adaptation remaining in the transparent first device region and thus being visible in the first window.

The security device may extend across and/or overlap the first window. The first device region may be located between the first opaque region and/or first window and the second outer surface. The first device region may extend at least partially across the first opaque region such that part of the first device region is visible at least partially around the second device region in the first window. Thus the first device region may be partially hidden under the first opaque region when the first outer surface is viewed in reflected light. However, a larger area of the first device region may be visible when the second outer surface is viewed in reflected light, which may assist with verification.

The first device region may be formed from at least one first device layer, which may comprise at least one plastic layer, at least one first device insert and/or at least one ink layer. Thus the first device region may extend across substantially all of the security sheet. As a result, the first device layer may protect substantially all of the security sheet from any attempted fraudulent substitution. Any attempt to alter or substitute features in the thickness of the security sheet between the first device region and first and second outer surface would leave identifiable visible marks in the first device region. The fraudster would only be able to avoid such visible marks by replacing the entire at least one first device layer, but this would most likely result in destruction of the other layers of the security sheet.

Furthermore, by virtue of the at least one first device layer extending to the edges of the security sheet, the optical characteristics of the first device region may be visible at the edges of the security sheet. Thus the security sheet may be additionally verifiable by checking that these optical characteristics are visible at its edges. In an embodiment the first device region is fluorescent and when the security sheet is viewed in transmitted or reflected ultraviolet light its edges fluoresce. The at least one first device layer may be arranged to have light guiding properties such that under ultraviolet light the edges glow. For example, the at least one first device layer may comprise suitable materials as disclosed in US-A-2019/0016953.

The first opaque region may be formed from at least one first opaque layer, which may comprise at least one plastic layer and/or at least one ink layer. The first opaque layer may be applied in the laminar structure over one or more of the plastic layers.

The second device region may extend through the first device region such that the first device region extends at least partially around the second device region. The second device region may extend through the thickness of the plastic substrate by different amounts. The second device region may be formed from the second device insert extending through at least the at least one first device layer. The second device region may extend through the first opaque region through the first window. The second device region may be formed from the second device insert extending through at least the at least one first opaque layer.

The plastic substrate may be substantially transparent between the first and second outer surfaces in the first window. In particularly, it may be substantially transparent through the first device region. The second device region may be transparent such that the plastic substrate is also transparent between the first and second outer surfaces through the second device region.

In order to form the second device region, the method may further comprise forming a second device insert aperture in the at least one first opaque layer, the at least one first device layer and/or at least one plastic layer. The second device insert aperture may be formed by punching, such as to form a second device insert aperture entirely surrounded by the at least one first opaque layer, and/or by cutting, such as at the edge of the at least one first opaque layer to form an edge window extending from the at least one first opaque layer to the edge of the security sheet. The method may further comprise inserting the second device insert into the second device insert aperture during or prior to the formation of the laminar structure. The laminar structure may be for forming a plurality of security sheets and the second device insert aperture of adjacent security sheets may be formed as a single aperture. A single insert may be added to form the second device inserts of the adjacent security sheets. Subsequently the security sheets are separated from one another by cutting through the single aperture and single insert, thereby forming two security sheets, each comprising a second device insert aperture and a second device insert.

The first and second device regions may be adjacent to one another. As a result, when viewed in reflected light incident upon the first outer surface, at least part of the first device region may be visible at least partially around and adjacent to the second device region in the first window. Such an arrangement allows the different optical detection characteristics to be viewed and compared directly next to one another.

The security device may further comprise a third device region arranged in the plastic substrate. When viewed in reflected light incident upon the first outer surface, at least part of the first device region is visible at least partially around the second device region in the first window. The third device region may be visible at least partially between the first and second device regions. The third device region may be opaque and/or may have different optical detection characteristics to those of the first and second device regions. The laminar structure may therefore comprise at least one third device layer forming, in the plastic substrate, the third device region of the security device arranged in the plastic substrate. The at least one third device layer may comprise a third device insert, at least one ink layer and/or at least one plastic layer. As a result, the third device region may appear to separate the first and second device regions from one another when viewed at the first outer surface, even though the first and second device regions may actually be adjacent to one another within the plastic substrate and below the third device region. Such a complex arrangement is harder for a counterfeiter to reproduce.

In order to effectively form the third device region, the method may further comprise forming, punching or cutting a first window aperture, the at least one third device layer and a third device aperture from the at least one first opaque layer. The third device aperture may be within the at least one third device layer and may therefore form part of the first window aperture. The laminar structure may further comprise the at least one third device layer and the second device insert may be located within the third device aperture. The first window aperture forms the first window in the plastic substrate.

The security sheet may comprise at least one further plastic region, formed from at least one layer, overlying and/or underlying at least the opaque region, first device region and second device region.

The security sheet may comprise a second opaque region extending at least partially across the plastic substrate between the first opaque region and the second outer surface. This second opaque region may enable the formation of a full window and/or half window depending upon its alignment with the first window. The second opaque region may at least partially extend across the first window, thereby forming at least a half window. The second opaque region may comprise a second window at least partially extending across the first window, thereby forming at least a full window. The laminar structure may comprise at least one second opaque layer forming, in the plastic substrate, a second opaque region extending at least partially across the plastic substrate between the first opaque region and the second outer surface.

In the security sheet, when the first outer surface is viewed in transmitted light incident upon the second outer surface, at least part of the first device region is visible at least partially around the second device region in the first window. Such an arrangement may be formed particularly when there is no second opaque region or the second opaque region is aligned such that a full window is formed through the first and second windows.

The security sheet may comprise a first transparent region overlying the first opaque region and the first window and forming the first outer surface. The laminar structure may comprise at least one first outer layer forming, in the plastic substrate, a first transparent region overlying the first opaque region and the first window and forming the first outer surface.

The security sheet may comprise at least one core region extending at least partially across the plastic substrate and located between the first opaque region and the second outer surface. The laminar structure may comprise at least one core layer forming, in the plastic substrate, at least one core region extending at least partially across the plastic substrate and located between the first opaque region and the second outer surface.

The security sheet may comprise a second transparent region extending across the plastic substrate and located between the second outer surface and the first opaque region and forming the second outer surface. The laminar structure may comprise at least one second outer layer forming, in the plastic substrate, a second transparent region extending across the plastic substrate and located between the second outer surface and the first opaque region and forming the second outer surface.

The different optical detection characteristics ensure that the first and second device regions are distinguishable from one another by the naked human eye and/or by a machine (e.g. an optical detector such as a camera) when the first and second device regions are viewed in reflected light and/or in transmitted light. A human and/or machine may therefore be able to authenticate the security sheet (i.e. confirm that it is not a counterfeit or forgery) based upon the optical sensory feedback from the human eye and/or machine identifying the correct different optical detection characteristics distinguishing between the first and second device regions. If the different appearances of the first and second device regions are not identified as being correct the security sheet can be identified as being inauthentic. The light under which the first and second device regions are distinguishable may be visible and/or non-visible light.

In the present disclosure "visible light" refers to light having a wavelength within the visible spectrum, which is approximately 400 to 750 nm, whilst "non-visible light" refers to light having wavelengths outside of this range (e.g. ultraviolet or infrared light). In the present disclosure the use of the term "reflected light" refers to viewing the security sheet from the same side as the light source and the use of the term "transmitted light" refers to viewing the opposing side of the security sheet to the light source.

The different optical detection characteristics may therefore comprise at least one of different visible colours, different visible responses to an external stimulus, different opacities and/or different optically variable effects.

In the present disclosure the term "colour" includes achromatic hues such as black, grey, white, silver etc., as well as chromatics such as red, blue, yellow, green, brown etc. "Different colours" are those which clearly present a contrast to one another that is visible to the naked human eye in reflected or transmitted light even without a close inspection. The difference might be in terms of the colour's hue or tone or both. For example, in preferred embodiments, two colours will be considered substantially the same as one another if the Euclidean distance $\Delta E^*_{ab}$ between them in CIELAB colour space (i.e. the CIE 1976 L*a*b* colour space) is less than 3, more preferably less than 2.3, more preferably less than 1. The value of $\Delta E^*_{ab}$ is measured using the formula:

$$\Delta E^*_{ab}=\sqrt{[(\Delta L^*)^2+(\Delta a^*)^2+(\Delta b^*)^2]}$$

Where $\Delta L^*$, $\Delta a^*$ and $\Delta b^*$ are the distance between the two colours along the L*, a* and b* axes respectively (see "Digital Color Imaging Handbook" (1.7.2 ed.) by G. Sharma (2003), CRC Press, ISBN 0-8493-0900-X, pages 30 to 32). Conversely, if $\Delta E^*_{ab}$ is greater than or equal to 1, more preferably 2.3 or yet more preferably 3, the two colours will be considered different. The colour difference $\Delta E^*_{ab}$ can be measured using any commercial spectrophotometer, such as those available from Hunterlab of Reston, Virginia, USA.

In the present disclosure the "different visible colours" means that the first and second device regions have different colours which can be seen by the naked human eye under reflected or transmitted visible light. It is most preferable that the visible light is white light, i.e. contains substantially all the visible wavelengths in more or less even proportion. They may result from the appropriate selection of colours resulting from the material of the first and second device regions, such as the inclusion of appropriate additives therein, and/or ink layers within or on the first and second device regions.

In the present disclosure the "different visible responses to an external stimulus" means that the first and second device regions have different responses that are distinguishable from one another by the human eye when the external stimulus is applied to the first and second device regions. In particular, the first and/or second device regions may change colour in response to the application of an external stimulus, the change in colour being visible to the naked eye. The first and/or second device regions may exhibit different colours to one another in response to the external stimulus. The first and second device regions may therefore have different luminescence, different infrared absorption characteristics, different photochromic responses, different electrochromic responses, different piezochromic responses, different thermochromic responses and/or the like. As such, the external stimulus may be, respectively, non-visible light, infrared light, different wavelengths or intensities of visible light, an electric current, an external pressure, heat and/or the like.

In particular, the external stimulus may be reflected and/or transmitted non-visible light such that the first and second device regions may have different luminescences (e.g. different fluorescence or phosphorescence) and/or different infrared absorption characteristics. In particular, when viewed in ultraviolet light (i.e. a wavelength of 200-400 nm) or infrared light (i.e. a wavelength of 750 nm to 1 mm), the first and second device regions exhibit different colours (as defined above) or one of the first and second device regions exhibits a luminescent response whilst the other does not. The first and/or second device regions may comprise a suitable material, coating or additive (such as a luminescent additive in the plastic) for achieving such effects.

In the present disclosure "different opacities" means that one of the first and second device regions is more transparent (i.e. more light can be transmitted therethrough) than the other. The first and second device regions may have different opacities and different colours. In either case of the first and second device regions have the same or different opacities, the second device region may be transparent in addition to the first device region being transparent. In the present disclosure "transparent" is used to mean that the material is substantially visually see-through, such that an item on one side of the material can be seen substantially sharply (i.e. rather than as a shadow) through the material from the other side. Therefore, transparent materials should have low optical scatter. However, transparent materials may nonetheless need not be clear and may carry a colour tint, the colour being exhibited as different visible colours, different visible responses to an external stimulus and/or different optically variable effects.

In the present disclosure "different optically variable effects" means that the appearance of the first and/or second device regions is different at different angles of view. Preferably the different optically variable effect is colour shifting such that the colour, in visible and/or non-visible light, of the first and/or second device region varies at different angles of view in reflected and/or transmitted light. For example, as the angle of view passes through a first viewing angle the colour of the first device region may shift from a first colour to a different second colour. Furthermore, as the angle of view passes through a second viewing angle the colour of the first device region may shift from the second colour to a different third colour. The colour of the second device region may also vary in a similar manner across the first and second viewing angles and may have a different colour to the first device region across substantially all viewing angles. The colour of the second device region may shift from the second colour to the first colour as the angle of view passes through the first viewing angle as the colour of the first device regions shifts from the first colour to the second colour. For example, as the security sheet is viewed through the first and second viewing angles the colour of the first device regions may shift from red to green to blue. The second device region may shift from green to blue at the same angle as the first device shifts from red to green.

In order to obtain the different optically variable effects, one of or both of the first and/or second device regions may comprise at least one optically variable device, ink and/or material. The at least one optical variable device may be a hologram or other diffractive device, a moiré interference or other mechanism relying on parallax such as Venetian blind devices, a device which make use of at least one focusing element such as a lens, a moiré magnifier device, an integral imaging device or lenticular device, a thin-film interference structure or the like. The optically variable ink and/or material may comprise an interference pigment, a pearlescent pigment, a liquid crystal film or pigment, photonic crystals, a metallic material or the like.

The optical detection characteristics may differ in that only one of the first and second device regions exhibits a visible response in response to the external stimulus and/or optically variable effect whilst the other does not. However, preferably the first and second security device regions both exhibit different responses or colours in response to the external stimulus and/or both have exhibit different appearances at different angles of view.

The colours, i.e. the visible and/or luminescent colours, of the first and second device regions may change based upon the superposition of backgrounds of different, preferably contrasting, colour under the first and second device regions (particularly when they are both transparent). For example, the first and/or second device regions may exhibit different visible and/or luminescent colours when viewed against a dark (e.g. black) background as compared to their visible and/or luminescent colours when viewed against a light (e.g. white) background. Preferably the luminescent colours are fluorescent colours. Such an effect and materials for achieving such an effect are disclosed in US-A-2019/0016953.

Furthermore, the security sheet may have various combinations of the aforementioned different optical detection characteristics. In a particular example the first and second device regions may have a first colour combination (e.g. the same or different visible colours) when viewed in visible light and a second colour combination (e.g. the same or different colours under non-visible light, but different to those of the first colour combination) when viewed in a combination of visible and non-visible light and/or in non-visible light. Furthermore, the colours of the first and/or second device regions may change upon superposition over contrasting backgrounds. Preferably at least one of the first and second device regions has substantially the same colour when viewed against a first background in visible light as its colour when viewed against a second background in non-visible light, the first and second backgrounds being in contrast to one another. Suitable materials for achieving such an effect are disclosed in US-A-2019/0016953.

In order to achieve the different optical detection characteristics, the structure and materials of the first and second device regions and thus the materials of the at least one first device layer and second device insert, are selected accordingly. In particular, the plastic, additives in the plastic, ink layer(s), additional optically variable devices and the like may be selected in the at least one first device layer and second device insert in order to obtain the required different optical detection characteristics. The second device insert may be transparent such that the background is visible through it in reflected light. The second device insert may comprise the same plastic as that of the at least one plastic layer in which it is inserted and may comprise an additive therein and/or an ink layer thereon.

The security sheet may be for displaying personal data. The security sheet may comprise personal data located outside of the first window and overlying the first opaque region. In the present disclosure the "personal data" relates to the holder of the security sheet or security document. Such personal data may comprise a name, date of birth, portrait, nationality, address and/or machine readable data relating to the holder.

The security sheet may further comprise at least one security element at least partially visible in the at least one window and overlapping the first and/or second device region. The at least one security element may have different visible characteristics to those of the different optical detection characteristics, such as different visible colour and/or structure. The at least one security element may form personal data and may comprise at least one of printed ink, laser marking, a security thread, a hologram, a foil, a demetallised structure, a biometric data storage device and the like.

The security sheet is preferably rigid or at least semi-rigid. One or more plastic layers and/or insert(s) may be at least partially opaque, at least partially transparent and/or laser markable. The insert(s) may be plastic. The plastic of the security sheet, plastic layers and insert(s) may comprise at least one of a thermoplastic polymer, polycarbonate, polybutylene terephthalate, polyester, polyethylene, polypropylene, polyvinyl chloride, a co-polymer comprised of any of the previous thermoplastic polymers and the like. Polycarbonate is particularly suitable due to its high durability, its ease of manufacture and the ease with which security features can be incorporated within it. The thickness of the plastic substrate, which is the distance between the first and second outer surfaces, is preferably at least approximately 150 μm and more preferably at least approximately 300 μm. In particular, the plastic substrate may be between approximately 300 μm and 1000 μm thick and, for example, may be approximately 800 μm thick. Preferably attaching the security sheet comprises applying heat and/or pressure, such as by welding or lamination, to the plastic layers and second device insert such that they are attached together.

The present disclosure further provides a security document comprising the security sheet. The security document may be a security booklet (e.g. a passport), security card, passbook, identification document, certificate, license, cheque book or the like. In the case of a security booklet such as a passport, the security document may comprise a flexible attachment layer connecting the security sheet to the rest of the security document, such as visa pages and/or a cover.

BRIEF DESCRIPTION OF THE DRAWINGS

By way of example only, embodiments of a security sheet, a security document and a method in accordance with the present disclosure are now described with reference to, and as shown in, the accompanying drawings, in which.

DETAILED DESCRIPTION

FIGS. 1A to 2B illustrate a security sheet 10 of a security document in accordance with the present disclosure. In the illustrated the example the security document comprises a passport (only the security sheet 10 thereof is illustrated) and the security sheet 10 comprises the data page of the passport. The security sheet 10 comprises personal data 11, which may be printed and/or laser marked on the security sheet 10.

Figure 1A:
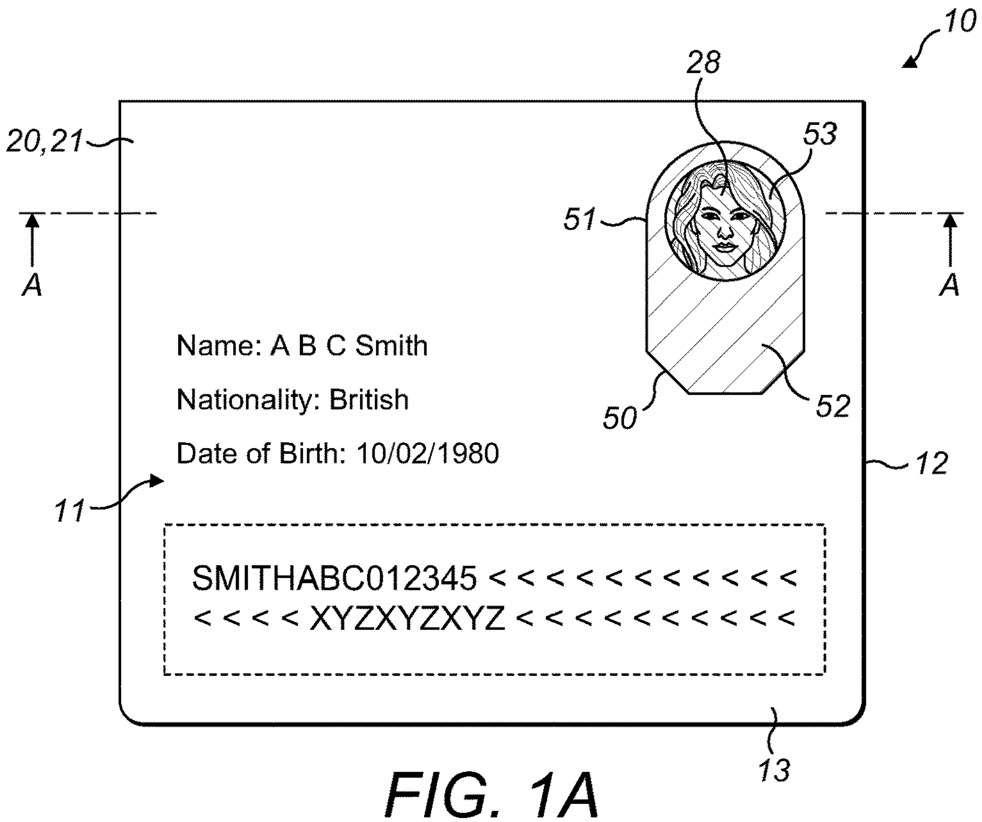
FIG. 1A is a plan view of a security sheet of a security document, particularly a data page of a passport, according to the present disclosure, when viewed in visible light.
Figure 1B:
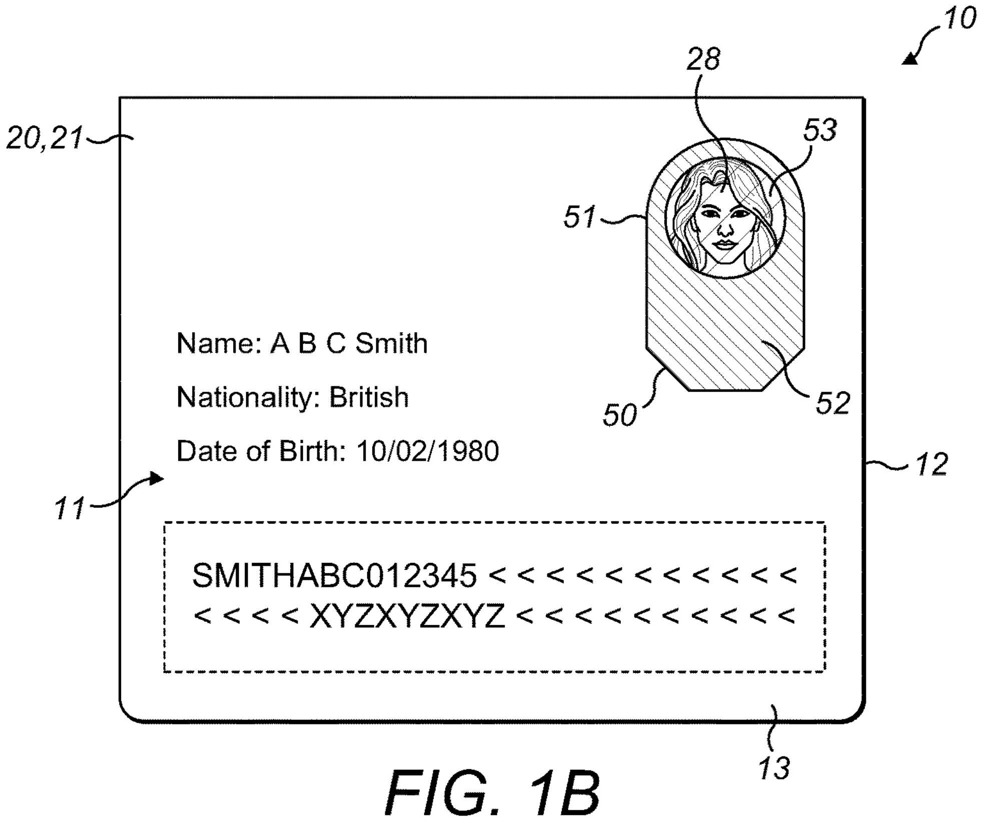
FIG. 1B is a plan view of the security sheet of FIG. 1 when viewed in non-visible light.
Figures 2A, 2B:
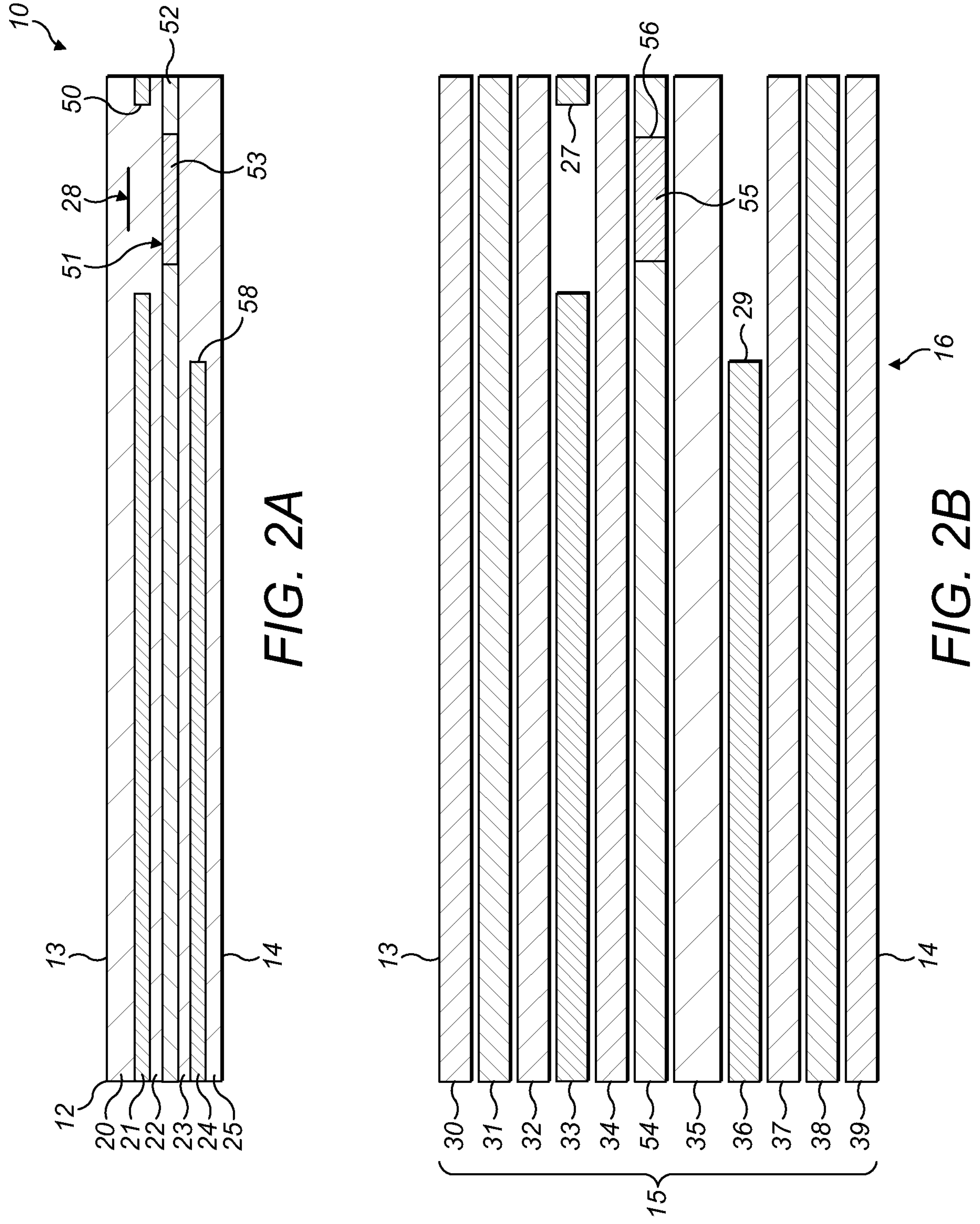
FIG. 2A is a side view of a cross-section through section A-A of the security sheet of FIG. 1.
FIG. 2B is a side view of a cross-section of a laminar structure for forming the security sheet of FIG. 2A.

As shown in further detail in FIG. 2A, the security sheet 10 comprises a plastic substrate 12 having a first and second outer surfaces 13, 14. Each of the first and second outer surfaces 13, 14 may be substantially flat and planar as illustrated. The plastic substrate 12 is formed from a plurality of plastic layers 15 attached together and which may be fused together into a substantially non-laminar or unitary structure. FIG. 2B illustrates a laminar structure 16 comprising the plastic layers 15 laid over one another prior to their attachment together to form the plastic substrate 12. The plastic layers 15 may be attached together by the application of heat and/or pressure, such as during lamination and/or welding, by adhesion and/or any other suitable method.

The plastic substrate 12 comprises a first opaque region 21 extending partially across the plastic substrate 12 between the first and second outer surfaces 13, 14 and a first window 50 extending through and at least partially surrounded by the first opaque region 21. The first opaque region 21 may be formed from at least one first opaque layer 33 comprising at least one of the plastic layers 15 as illustrated in FIG. 2B and/or at least one ink layer. The first window 50 may comprise a first window aperture 27 through the at least one plastic layer 15 and/or at least one ink layer. Alternatively, the at least one first opaque layer 33 may not extend to the edge of the plastic substrate 12 and the first window 50 may be formed as an edge window. In particular, the first window may be partially surrounded by the first opaque region and extend between an edge of the at least one first opaque layer 33 and the edge of the plastic substrate 12. If the at least one first opaque layer 33 comprises at least one ink layer it may be applied in the laminar structure 16 over at least one of the plastic layers 15 apart from in the region forming the first window 50.

The plastic substrate 12 may comprise a first transparent region 20 overlying the first opaque region 21 and the first window 50. The first transparent region 20 may extend from the first opaque region 21 to, and thereby form, the first outer surface 13. The first transparent region 20 may be at least partially transparent such that the first opaque region 21 and first window 50 are at least partially visible through it when the first outer surface 13 is viewed in reflected visible light. As illustrated in FIG. 2B, the first transparent region 20 may be formed from at least one first outer layer 30, 31, 32 (three first outer layers 30, 31, 32 are illustrated) of the plastic layers 15, which may be arranged to overlie the at least one first opaque layer 33 and first window aperture 27 in the laminar structure 16. The at least one first outer layer 30, 31, 32 may form the first outer surface 13 of the laminar structure 16 and may be transparent or at least partially transparent.

The plastic substrate 12 may comprise at least one core region 22, 23 extending at least partially across the plastic substrate 12 and located between the first opaque region 21 and the second outer surface 14. The at least one core region 22, 23 may be transparent and may comprise first and second core regions 22, 23. As illustrated in FIG. 2B, the at least one core region 22, 23 may be formed from at least one core layer 34, 35 of the plastic layers 15, such as first and second core layers 34, 35. The at least one core layer 34, 35 may be transparent and the at least one first opaque layer 33 may at least partially overlie the at least one core layer 34, 35 in the laminar structure 16.

The plastic substrate 12 may further comprise a second opaque region 24 extending at least partially across the plastic substrate 12 and located between the first opaque region 21 and the second outer surface 14. In particular, as illustrated in FIG. 2A, the second opaque region 24 may be located between the at least one core region 22, 23 and the second outer surface 14. In a similar manner to the first opaque region 21, the second opaque region 24 may be formed from at least one second opaque layer 36 comprising at least one of the plastic layers 15 (as in FIG. 2B) and/or at least one ink layer. The at least one second opaque layer 36 may at least partially overlie the at least one core layer 34, 35 in the laminar structure 16.

The plastic substrate 12 may further comprise a second window 58 through the second opaque region 24. In a similar manner to the first window 50, the second window 58 may comprise a second window aperture 29 through the at least one second opaque layer 36 or an edge window. As in FIGS. 2A and 2B, the second window 58 may be an edge window such that the at least one second opaque layer 36 may not extend to the edge of the plastic substrate 12. The second window 58 may extend from the edge of the at least one second opaque layer 36 and the edge of the plastic substrate 12. The second window 58 may at least partially overlap and/or be aligned with the first window 50.

The plastic substrate 12 may comprise a second transparent region 25 extending thereacross and located between the second outer surface 14 and the second opaque region 24, at least one core region 22, 23 and/or first opaque region 21. The second transparent region 25 may extend to, and thereby form, the second outer surface 14. The second transparent region 25 may be at least partially transparent such that the second opaque region 24, at least one core region 22, 23 and/or first opaque region 21 are at least partially visible through it when the second outer surface 14 is viewed in reflected visible light. As illustrated in FIG. 2B, the second transparent region 25 may be formed from at least one second outer layer 37, 38, 39 (three second outer layers 37, 38, 39 are illustrated) of the plastic layers 15, which may be arranged to overlie and/or overlap the at least one first opaque layer 33, at least one core layer 34, 35 and/or the at least one second opaque layer 36 in the laminar structure 16. The at least one second outer layer 37, 38, 39 may form the second outer surface 14 of the laminar structure 16 and may be transparent or at least partially transparent.

The plastic substrate 12 further comprises a security device 51 aligned with the first window 50 and comprising first and second device regions 52, 53 visible in the first window 50 in reflected light incident upon the first outer surface 13. The first device region 52 is transparent and extends at least partially around, preferably entirely around (as illustrated) the second device region 53. The second device region 53 may therefore be at least partially separated, preferably entirely separated (as illustrated), from the edge of the first window 50 when the first outer surface 13 is viewed in reflected light incident thereupon, such as when viewed in plan view or perpendicular to the first outer surface 13 as in FIGS. 1A and 1B.

The first device region 52 may extend at least partially across the plastic substrate 12 and may be located between the first opaque region 21 and the second outer surface 14. The first device region 52 may be formed from at least one first device layer 54, comprising at least one of the plastic layers 15 and/or at least one ink layer, which may be located between the at least one first opaque layer 33 and the second outer surface 14. At least one core region 22, 23 and at least one core layer 34, 35 may be located on at least one side, preferably both sides as illustrated, of the first device region 52 and at least one first device layer 54 respectively. The first device region 52 and at least one first device layer 54 may extend at least partially across, and preferably entirely across, the first opaque region 21 and first window 50 and at least one first opaque layer 33 as illustrated. Thus the first opaque region 21 and first device region 52 may extend between (preferably all) edges of the security sheet 10.

The second device region 53 is formed from a second device insert 55 in at least one of the plastic layers 15. The second device insert 55 may be transparent or opaque. The second device insert 55 may be located in a second device insert aperture 56 through at least one of the plastic layers 15. The second device insert 55 may extend through a second device insert aperture 56 in the at least one first device layer 54. As illustrated in FIGS. 2A and 2B, the second device region 53 may not extend through the first window 50 and may have substantially the same thickness as the first device region 52, such as if the second device insert 55 has the same thickness as the at least one first device layer 54 and does not extend through any of the other plastic layers 15.

Figure 3A:
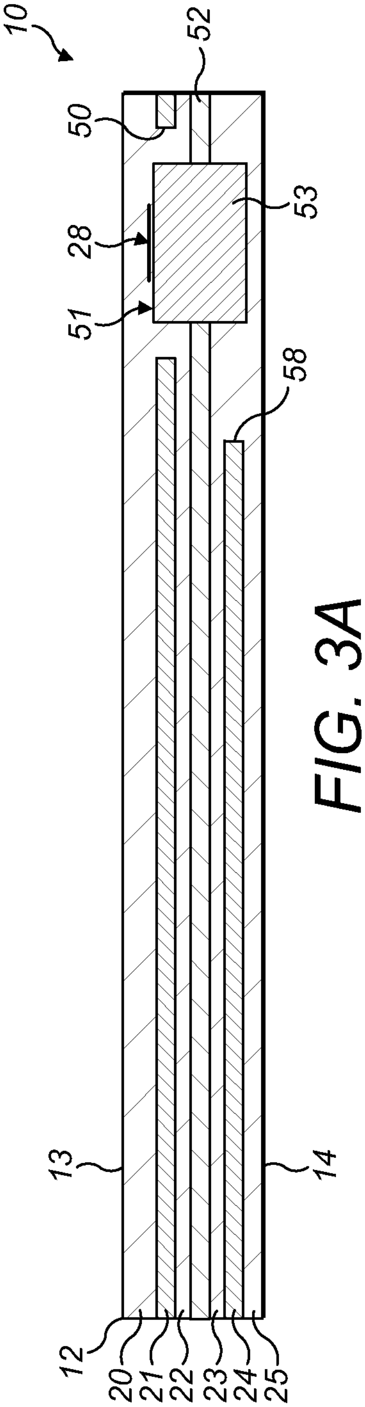
FIG. 3A is a side view of a further embodiment of a cross-section through section A-A of the security sheet of FIG. 1.
Figure 3B:
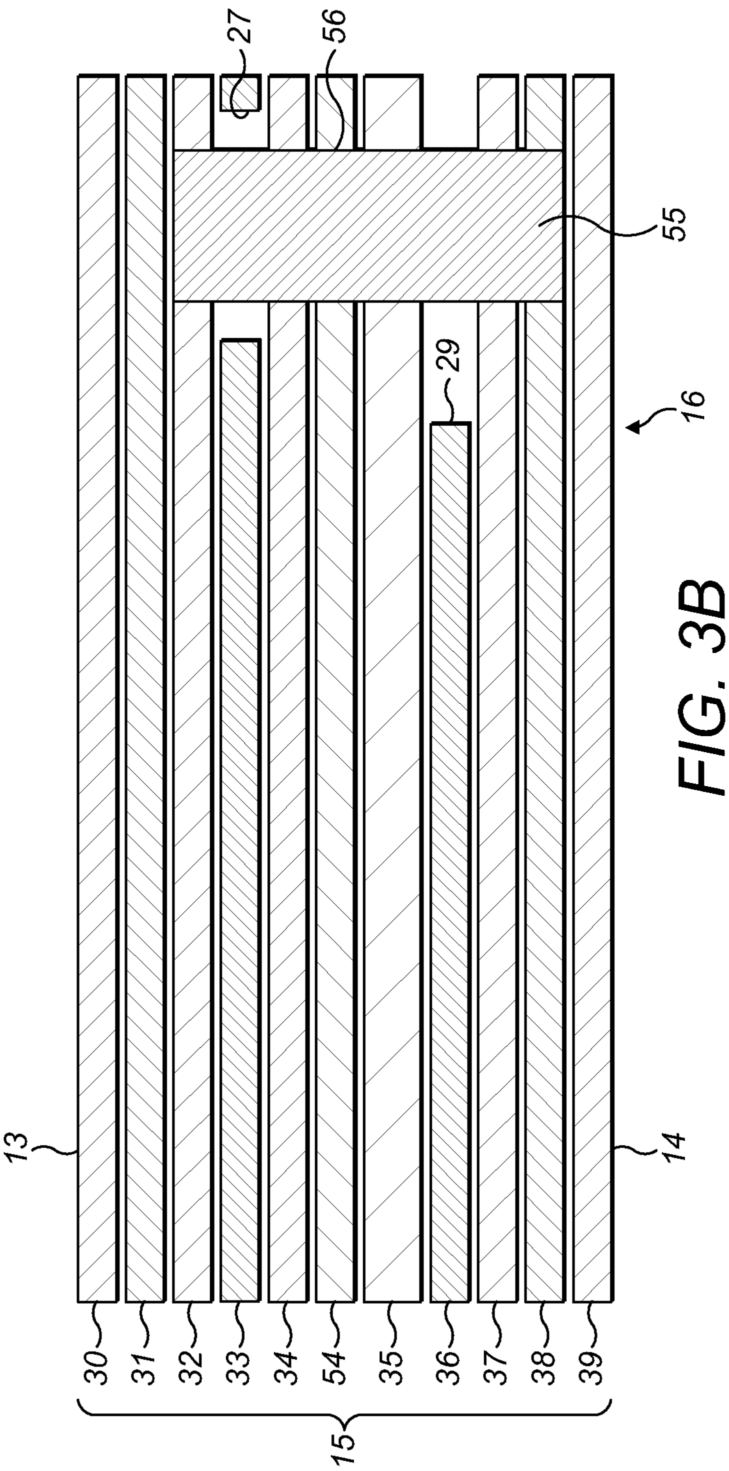
FIG. 3B is a side view of a cross-section of a laminar structure for forming the security sheet of FIG. 3A.

The second device region 53 may be formed from a second device insert 55 extending through a plurality of the plastic layers 15. FIGS. 3A and 3B illustrate an embodiment in which the second device region 53 and second device insert 55 extend through the first window 50 and first window aperture 27 respectively. In particular, the second device insert 55 may extend through at least one first device layer 54, at least one core layer 34, 35, at least one first and/or second opaque layer 33, 36 and/or at least one first and/or second outer layer 30, 31, 32, 37, 38, 39. Thus the second device region 53 may extend at least partially into the at least one core region 22, 23, second window 58, first transparent region 20 and/or second transparent region 25. The manufacture of such a security sheet 10 may be improved due to the increased ease of handling a thicker second device insert 55. Furthermore, such an arrangement provides for additional verification since, if the second device insert 55 is thicker than the at least one first device layer 54, they may have different optical densities and such a difference may be visible in transmitted light.

The first and second device regions 52, 53 may be visible in the second window 58 in reflected light incident upon the second outer surface 14. As illustrated in FIGS. 2A to 3B, the second opaque region 24 may not overlap the first window 50 such that the first and second windows 50, 58 overlap one another and the security device 51 is aligned with the first and second windows 50, 58. Such an arrangement of the first and second windows 50, 58 is known as a full window. The security sheet 10 may therefore be at least partially transparent and see through in the first and second windows 50, 58, particularly through the transparent first device region 52 and, if also transparent, the second device region 53. Thus the first and second device regions 52, 53 can be verified from both of the first and second outer surfaces 13, 14.

The first and second windows 50, 58 may have different sizes or surface areas (i.e. their areas when viewed at the first and second outer surfaces 13, 14) such that different parts of the security device 51 are visible therein. As illustrated in FIGS. 2A to 3B, the second window 58 may extend across a greater area than the first window 50 such that more of the security device 51, particularly of the first device region 52, is visible in the second window 58 than in the first window 50.

Figure 4A:
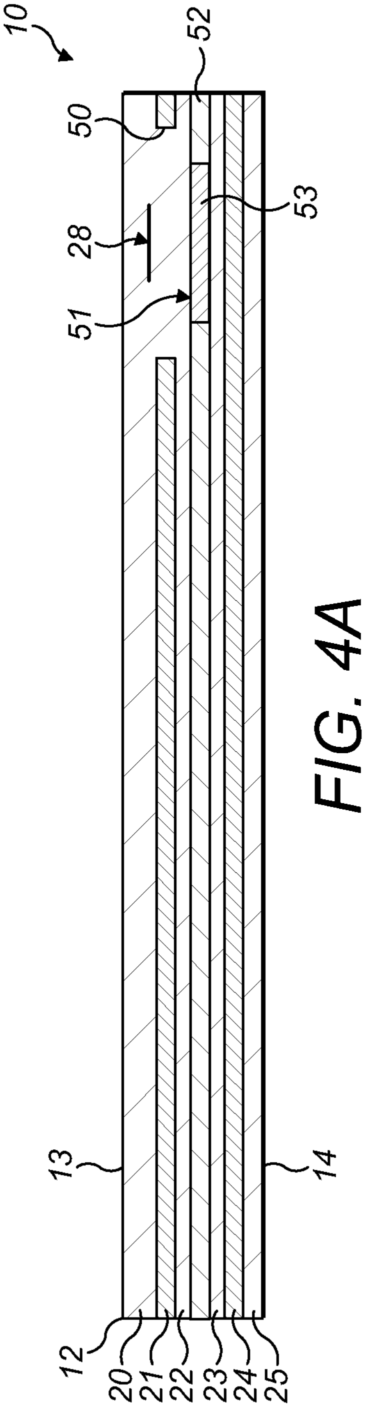
FIG. 4A is a side view of a further embodiment of a cross-section through section A-A of the security sheet of FIG. 1.
Figure 4B:
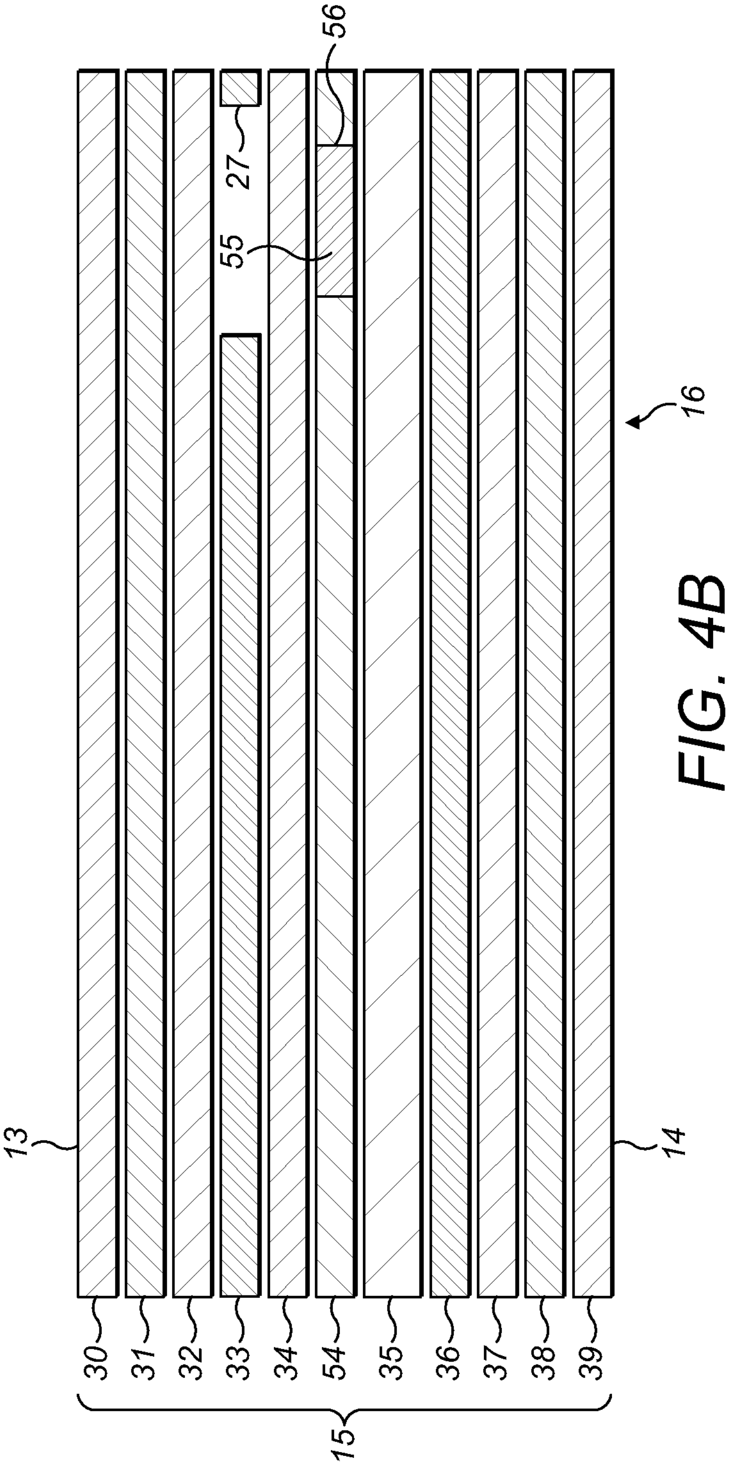
FIG. 4B is a side view of a cross-section of a laminar structure for forming the security sheet of FIG. 3A.

FIGS. 4A and 4B illustrate a further embodiment in which the second opaque region 24 overlaps the first window 50 such that a half window is formed. In particular, the at least one second opaque layer 36 may extend entirely across the plastic substrate 12, or at least across the area adjacent to the at least one first opaque layer 33 forming the first window 50. The second opaque region 24 may thus provide an opaque background to the security device 51 when the first window 50 is viewed in reflected light incident upon the first outer surface 13. However, in other embodiments half and full windows may be formed, particularly when the second window 58 extends across a smaller area than the first window 50. For example, the second window 58 may be aligned with (i.e. overlap) and may be smaller than the first window 50. Thus a full window through the first and second windows 50, 58 would be formed within a half window. Alternatively, the second opaque region 24 may partially overlap the first window 50. In such arrangements the second opaque region 24 may provide a partially opaque background to the security device 51 when the first window 50 is viewed in reflected light incident upon the first outer surface 13.

The first and second device regions 52, 53 have different optical detection characteristics. The different optical detection characteristics may be at least one of different visible colours, different visible responses to an external stimulus, different opacities and/or different optically variable effects. In the illustrated embodiments the different optical detection characteristics comprise different visible colours and different visible responses to an external stimulus. In particular, the first and second device regions 52, 53 have different visible colours in the form of the first colour combination of FIG. 1A when viewed in reflected or transmitted visible light (for example the first device region 52 may be blue and the second device region 53 may be red). The first and second device regions 52, 53 are also fluorescent and have different colours in a second colour combination of FIG. 1B when viewed in reflected or transmitted ultraviolet light (for example the first device region 52 may be red and the second device region 53 may be green). The different optical detection characteristics may be visible in the first window 50 when the first outer surface 13 is viewed in reflected or transmitted light and visible in the second window 58 when the second outer surface 14 is view in reflected or transmitted light.

In addition, the colours of the first and second device regions 52, 53 in visible and/or non-visible light may vary depending upon the background colour over which the security sheet 10 is superposed. Such an effect may be particularly suitable when the security sheet 10 is at least partially transparent through the first window 50, such as when the first and second windows 50, 58 form a full window, if no second opaque region 21 is present or the second opaque region 21 does not overlap the first window 50, 58. In the present disclosure the background colour is the colour of a background object located on the side of the second outer surface 14 of the security sheet 10 and which may be visible through the first window 50 when it is viewed from the first outer surface 13 in reflected light or transmitted light (i.e. the background is located between the second outer surface 14 and the light source). In particular, the first and second device regions 52, 53 may have first and third colour combinations when viewed against first and second (different) backgrounds colours respectively in reflected and/or transmitted visible light. The first and second device regions 52, 53 may have second and fourth colour combinations when viewed against the first and second backgrounds of different colours respectively in reflected and/or transmitted non-visible light. Preferably the first and second backgrounds are contrasting colours, preferably being light and dark (e.g. white and black).

At least one of the first and second device regions 52, 53 may have the same colour when viewed against a first background in visible light as its colour when viewed against a second background in non-visible light. For example, when viewed in visible light the first and second device regions 52, 53 may be blue and red in the first colour combination against a light background and yellow and green in the third colour combination against a dark background. When viewed in non-visible light the first and second device regions 52, 53 may be red and green in the second colour combination against a light background and blue and yellow in the second colour combination against a dark background. Thus the first device region 52 appears blue when viewed against a light background in visible light and also blue when viewed against a dark background in non-visible light and has different colours when viewed against a dark background in visible light and a light background in non-visible light.

In order to achieve these different optical detection characteristics, the structure and materials of the first and second device regions 52, 53, and thus the materials of the at least one first device layer 54 and second device insert 55, are selected accordingly. The second device insert 55 may be transparent such that the background is visible through it in reflected light. Furthermore, the second device insert 55 and at least one device layer 54 may comprise the materials disclosed in US-A-2019/0016953 such that they are fluorescent and change colours depending upon the background colour.

The security sheet 10 may further comprise at least one security element 28 visible in the first window 50 (i.e. appearing to be located within the perimeter of the first window 50) and at least partially overlapping the security device 51 when the first outer surface 13 is viewed in reflected visible light. The at least one security element 28 may at least partially overlap the second device region 53. The or each at least one security element 28 may overlap only the second device region 53 as illustrated or, alternatively, may also overlap the first device region 52. Furthermore, at least one security element 28 may overlap only the first device region 52 and at least one security element 28 may overlap only the second device region 53.

As shown in the illustrated embodiments the at least one security element 28 may be located in the first transparent region 20, may comprise laser marking and/or may form personal data, such as in the form of a portrait of the holder of the security sheet 10. In particular, the at least one first outer layer 30, 31, 32 may comprise a suitable additive to enable such laser marking. However, in other embodiments the at least one security element 28 may be located in the first and/or second device region 52, 53, the at least one core region 22, 23 and/or the second transparent region 25. Furthermore, the at least one security element 28 may comprise printed ink, a security thread, a hologram, a foil, a demetallised structure, a biometric data storage device and the like. Thus the at least one first device layer 54 and/or second device insert 55, at least one core layer 34, 35 and/or at least one second outer layer 37, 38 respectively may comprise the at least one security element 28 prior to attachment in the laminar structure 16 and/or an additive for the application of the at least one security element 28 by laser marking after the attachment of the laminar structure 16.

The security sheet 10 may be manufactured by forming the laminar structure 16 from the plastic layers 15 and the second device insert 55. Prior to stacking the plastic layers 15 they may be preformed, cut or punched in order to form the second device insert aperture 56, the first window aperture 27 and the second window aperture 29. The second device insert 55 may be punched or cut from a separate layer or strip and may be located in the second device insert aperture 56. The plastic layers 15, including the at least one plastic layer 15 containing the second device insert 55, may then be overlaid to form the laminar structure 16. Suitable methods for incorporating such a second device insert 55 in the laminar structure 16 are disclosed in WO-A-2017/060688.

The plastic layers 15 and second device insert 55 may then be attached together. During lamination or welding heat and/or pressure may be applied to fuse or push the plastic layers 15 together and the material at the surface of each plastic layer 15 may soften, migrate into and substantially mix with the material at the surface of any adjacent plastic layer 15. The material of the plastic layers 15 and second device insert 55 may fill the spacing within the first and second window apertures 27, 29 and thereby form the first and second windows 50, 58. During the attachment process the second device insert 55 may be secured within the plastic substrate 12. For example, during lamination the second device insert 55 may be fused in the plastic layers 15. Thus there may be no distinguishable interface between adjacent plastic layers 15 and second device insert 55 such that the unitary plastic substrate 12 is formed, although they may be distinguishable by the regions of different material within the plastic substrate 12. The lamination may be performed using any suitable method and may be a substantially in-line method, similar to that of WO-A-2017/060684 and WO-A-2017/060688, in which a plurality of security sheets 10 are formed continuously.

In order to verify the security sheet 10 the document inspector can visually check that the first and second device regions 52, 53 have the correct different optical detection characteristics and have the correct location relative to one another. The security sheet 10 is difficult to replicate due to the complexity of forming the second device region 53 from a second device insert 55 within the first device region 52 and the difficulties in obtaining the necessary materials to form the different optical detection characteristics. By virtue of the first device region 52 being transparent it is more difficult to fraudulently adapt the security device 51, such as attempting to change the at least one security element 28 and/or the first and/or second device regions 52, 53, without leaving visible marks within the transparent first device region 52.

Various alternatives to the embodiments discussed above fall within the scope of the present disclosure. The security sheet 10 may comprise a plurality of first windows 50 and corresponding security devices 51 having the same or different arrangements as discussed above. The security sheet 10 may comprise only one or neither of the first and second transparent regions 20, 25 such that that first and/or second outer surface 13, 14 is formed by another region, such as the first opaque region 21, the at least one core region 22, 23 and/or the first device region 52. The security sheet 10 may not comprise the at least one core region 22, 23 and/or the at least one second opaque region 24. Furthermore, the security device 51 may comprise a plurality of second device regions 53, each formed from a second device insert 55 in at least one of the plastic layers 15.

In a particular embodiment the at least one first device layer 54 forming the first device region 52 may comprise a first device insert and the second device region 53 may be formed from the second device insert 55 being located within an aperture in the first device insert. The first device insert may then be inserted into an aperture in at least one of the plastic layers 15, such as one of the at least one core layers 34, 35 and/or the at least one first and/or second opaque layers 33, 36.

In the illustrated embodiments the outer perimeters of the first window 50 and second device region 53 have distinctive shapes (for example the second device region 53 is in the shape of a circle). However, in other embodiments the first window 50, second window 58, first device region 52 and/or second device region 53, particularly the shape(s) of the perimeter(s) thereof, may individually or collectively define one or more indicia, preferably alphanumeric character(s), symbol(s), logo(s), graphics or the like and the one or more indicia may convey information. The one or more indicia may represent personal data, which may be in addition to the personal data 11 located outside of the first window 50 and overlying the first opaque region 21. The first window 50, second window 58, first device region 52 and/or second device region 53 may have the same or different shapes.

Figure 5:
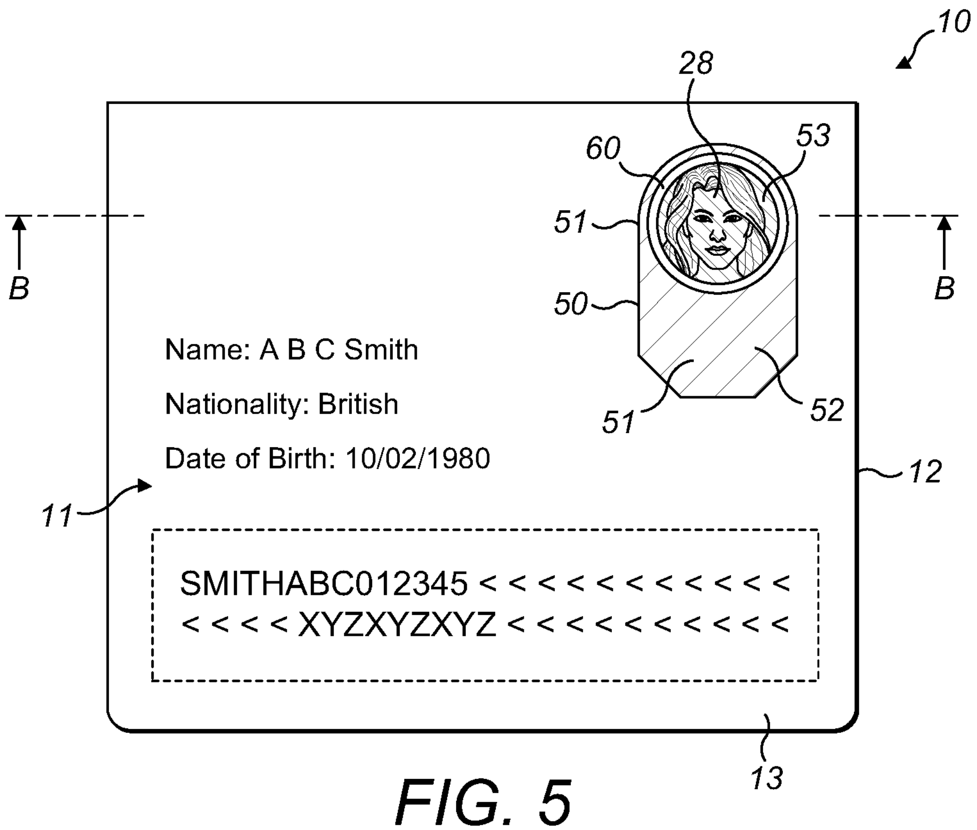
FIG. 5 is a plan view of a further embodiment of a security sheet of a security document, particularly a data page of a passport, according to the present disclosure, when viewed in visible light.
Figure 6A:
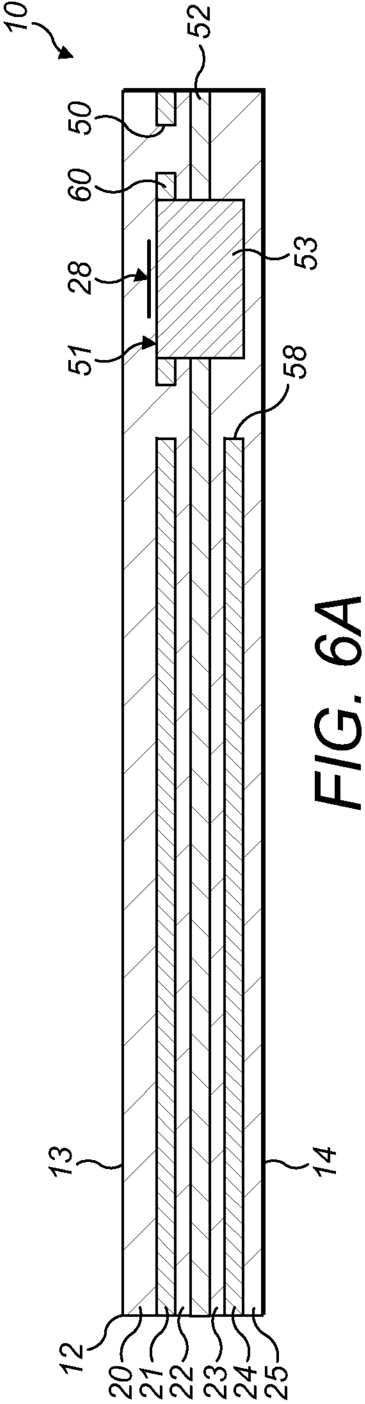
FIG. 6A is a side view of a cross-section through section B-B of the security sheet of FIG. 5.
Figure 6B:
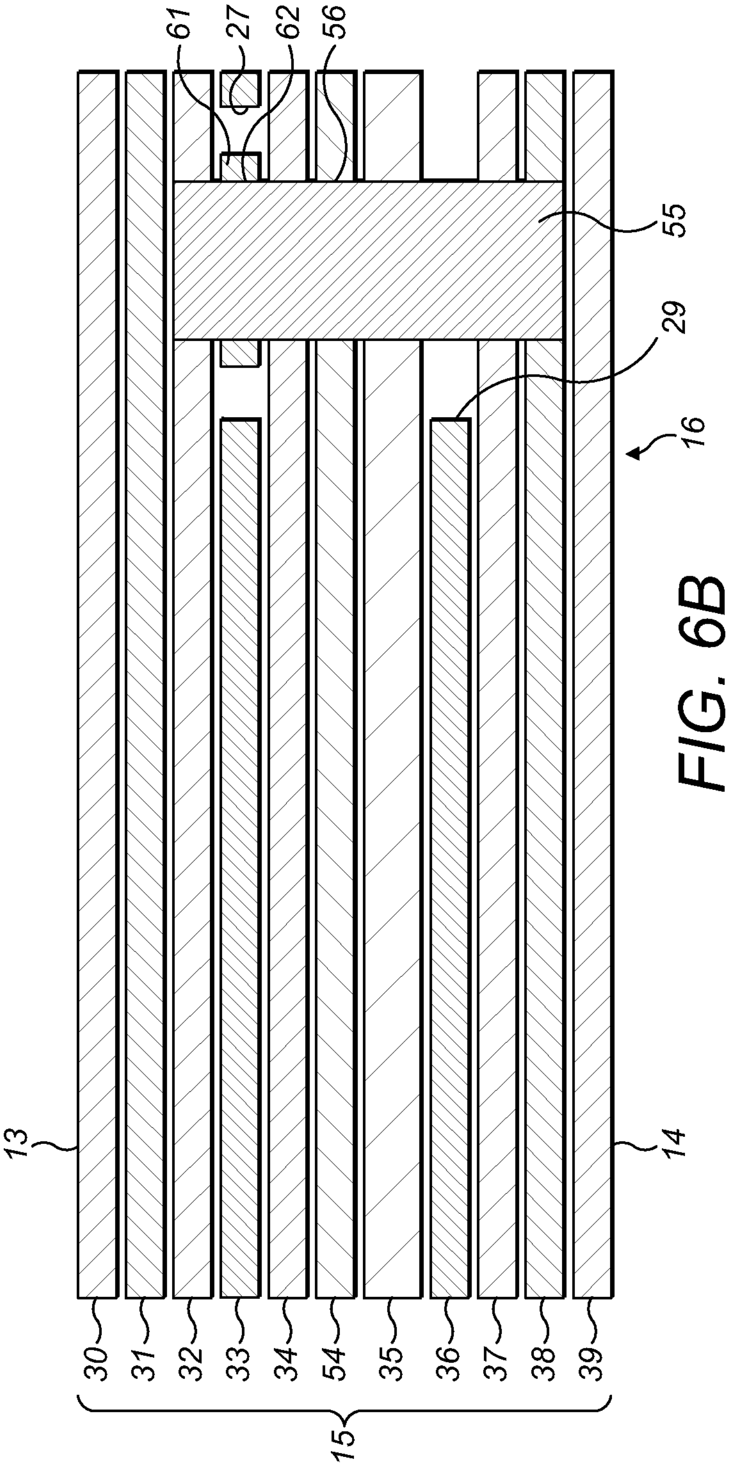
FIG. 6B is a side view of a cross-section of a laminar structure for forming the security sheet of FIG. 6A.

FIGS. 5 to 6B illustrate a further embodiment in which the security device 51 further comprises a third device region 60 overlapping the first window 50. The third device region 60 may be visible in the first window 50 (i.e. appearing to be located within the perimeter of the first window 50) when the first outer surface 13 is viewed in reflected visible light. As illustrated in FIG. 5, the third device region 60 may appear to be located between the first and second device regions 52, 53 and may, as illustrated in FIG. 6A, overlap the first and/or second device region 52, 53. In particular, the third device region 60 may extend at least partially, preferably entirely as illustrated, around the second device region 53 and overlap the first device region 52.

As illustrated in FIG. 6B, the third device region 60 may be formed from at least one third device layer 61 located in the laminar structure 16. The at least one third device layer 61 may comprise at least one third device aperture 62 through which the second device region 53 is visible. The at least one third device layer 61 may comprise a ring, which may be open or is preferably closed as in FIGS. 5 to 6B, and the ring may be located around the second device insert 55 in the laminar structure 16. The at least one third device layer 61 may comprise a third device insert that is located in the laminar structure 16 prior to attachment. Alternatively, the at least one third device layer 61 may comprise at least one ink layer located on top of the second device insert 55 and/or at least one of the plastic layers 15, such as the at least one core layer 34, 35 and/or first device layer 54. Yet furthermore, the third device layer may be formed from a portion of at least one plastic layer 15, such as of the at least one first opaque layer 33. In particular, the first window 50 may be formed by forming, punching or cutting the first window aperture 27, the at least one third device layer 61 and the third device aperture 62 from the at least one first opaque layer 33. The second device insert 55 may be located within the third device aperture 62 in the laminar structure 16 prior to attachment. Thus, upon attachment, the at least one third device layer 61 may form the third device region 60 within the first window 50 with the second device region 53 within it.

The third device region 60 may be opaque and have a similar colour to the first opaque region 21, particularly if they are both formed from the at least one first opaque layer 33. Preferably the third device region 60 has different optical detection characteristics to the first and second device regions 52, 53. Thus the first, second and third device regions 52, 53, 60 may therefore comprise at least one of different visible colours, different visible responses to an external stimulus, different opacities and/or different optically variable effects.

The invention claimed is:

1. A security sheet for displaying personal data comprising a plastic substrate comprising:

first and second outer surfaces;

a first opaque region extending partially across the plastic substrate between the first and second outer surfaces;

a first window at least partially surrounded by the first opaque region; and a security device comprising:

a transparent first device region formed from at least one first device layer; and a second device region formed from a second device region insert extending through the at least one first device layer, wherein the first and second device regions have different optical detection characteristics in reflection and the security device is arranged in the plastic substrate such that, when viewed in reflected light incident upon the first outer surface, at least part of the first device region is visible at least partially around the second device region in the first window, further wherein the first device region extends at least partially across the first opaque region such that part of the first device region is visible at least partially around the second device region in the first window.

2. The security sheet of claim 1, wherein the at least one first device layer comprises at least one plastic layer, at least one first device insert and/or at least one ink layer.

3. The security sheet of claim 2, wherein the second device region extends through the first device region such that the first device region extends at least partially around the second device region.

4. The security sheet of claim 1, wherein the second device region is transparent.

5. The security sheet of claim 1, wherein the first and second device regions are adjacent such that, when viewed in reflected light incident upon the first outer surface, at least part of the first device region is visible at least partially around and adjacent to the second device region in the first window.

6. The security sheet of claim 1, wherein the security device further comprises a third device region arranged in the plastic substrate such that, when viewed in reflected light incident upon the first outer surface, at least part of the first device region is visible at least partially around the second device region in the first window and the third device region is visible at least partially between the first and second device regions.

7. The security sheet of claim 1, wherein, when the first outer surface is viewed in transmitted light incident upon the second outer surface, at least part of the first device region is visible at least partially around the second device region in the first window.

8. The security sheet of claim 1 further comprising a second opaque region extending at least partially across the plastic substrate between the first opaque region and the second outer surface.

9. The security sheet of claim 1, wherein the shapes of the first window, first device region and/or second device region individually or collectively define one or more indicia.

10. The security sheet of claim 9, wherein the at least one security element and/or the shapes of the first window, first device region and/or second device region form personal data.

11. The security sheet of claim 1 comprising at least one security element at least partially overlapping the security device such that, when viewed in reflected light incident upon the first outer surface, the at least one security element is at least partially visible in the security device.

12. The security sheet of claim 1, wherein the different optical detection characteristics comprise at least one of different visible colors, different visible responses to an external stimulus, different opacities and/or different optically variable effects.

13. The security sheet of claim 12, wherein:

the different optical detection characteristics comprise different visible responses to an external stimulus and the first and second device regions have different luminescence, different infrared absorption characteristics, different photochromic responses, different electrochromic responses, different piezochromic responses and/or different thermochromic responses;

the different optical detection characteristics comprise different optically variable effects and the first and/or second device regions comprise at least one optically variable device, ink and/or material; and/or the different optical detection characteristics comprise different optically variable effects in the form of color shifting such that the color of the first and/or second device region varies at different angles of view.

14. The security sheet of claim 1, wherein:

the colors of the first and second device regions visible at the first outer surface change based upon the superposition of backgrounds of different color over the second outer surface;

the first and second device regions have a first color combination when viewed in visible light and a second color combination in non-visible light, the first and second color combinations being different to one another; and/or at least one of the first and second device regions has the same color when viewed against a first background in visible light as when viewed against a second background in non-visible light, the first and second backgrounds being in contrast to one another.

15. A method of manufacturing a security sheet, the method comprising:

forming a laminar structure comprising:

at least one first opaque layer extending partially across the laminar structure; and at least one first device layer, which is transparent, inserting a second device region insert located in and extending through the at least one first device layer;

attaching the laminar structure together to form a plastic substrate comprising:

first and second outer surfaces;

a first opaque region formed from the at least one first opaque layer;

a first window at least partially surrounded by the first opaque region; and a security device comprising first and second device regions formed from the at least one first device layer and second device region insert respectively, the first and second device regions having different optical detection characteristics, wherein the laminar structure is arranged such that the security device is arranged in the plastic substrate such that, when viewed in reflected light incident upon the first outer surface, at least part of the first device region is visible at least partially around the second device region in the first window, further wherein the first device region extends at least partially across the first opaque region such that part of the first device region is visible at least partially around the second device region in the first window.

16. The method of claim 15, wherein attaching the laminar structure comprises applying heat and/or pressure, lamination and/or welding.

17. The method of claim 15 further comprising forming a second device region insert aperture in the at least one first opaque layer, the at least one first device layer and/or at least one plastic layer and inserting the second device region insert into the second device region insert aperture.

18. The method of claim 15, wherein the laminar structure comprises at least one third device layer forming, in the plastic substrate, a third device region of the security device arranged in the plastic substrate such that, when viewed in reflected light incident upon the first outer surface, at least part of the first device region is visible at least partially around the second device region in the first window and the third device region is visible at least partially between the first and second device regions.

19. The method of claim 18, wherein the at least one third device layer comprises a third device insert, at least one ink layer and/or at least one plastic layer; and/or further comprising punching, cutting or forming a first window aperture, the at least one third device layer and a third device aperture from the at least one first opaque layer, wherein the laminar structure further comprises the at least one third device layer and the second device region insert is located within the third device aperture, wherein the first window aperture forms the first window in the plastic substrate.

20. The method of claim 15, wherein the second device region insert is also located in the at least one first opaque layer and/or at least one plastic layer.

* * * * *